US009020963B2

(12) United States Patent  
Goodman et al.

(10) Patent No.: US 9,020,963 B2  
(45) Date of Patent: Apr. 28, 2015

(54) PROVIDING RELEVANT ASSETS IN COLLABORATION MEDIUMS

(75) Inventors: Brian D. Goodman, Norwalk, CT (US); Frank L. Jania, Chapel Hill, NC (US); Darren M. Shaw, Fareham (GB)

(73) Assignee: International Business Machines Corporation, Armonk, NY (US)

( * ) Notice: Subject to any disclaimer, the term of this patent is extended or adjusted under 35 U.S.C. 154(b) by 2135 days.

(21) Appl. No.: 11/621,868

(22) Filed: Jan. 10, 2007

(65) Prior Publication Data

US 2008/0168134 A1 Jul. 10, 2008

(51) Int. Cl.
*G06F 7/00* (2006.01)
*G06F 17/30* (2006.01)
*H04L 12/58* (2006.01)
*H04L 29/08* (2006.01)

(52) U.S. Cl.
CPC .... *G06F 17/30867* (2013.01); *G06F 17/30997* (2013.01); *H04L 12/585* (2013.01); *H04L 51/12* (2013.01); *H04L 67/306* (2013.01)

(58) Field of Classification Search
USPC ................. 707/102; 709/201–207, 213–219; 715/751, 758
See application file for complete search history.

(56) References Cited

U.S. PATENT DOCUMENTS

| | | | |
|---|---|---|---|
| 6,230,171 B1 | 5/2001 | Pacifici et al. | |
| 6,240,444 B1 | 5/2001 | Fin et al. | |
| 6,731,308 B1 | 5/2004 | Tang et al. | |
| 6,791,583 B2 | 9/2004 | Tang et al. | |
| 6,847,959 B1 * | 1/2005 | Arrouye et al. | 1/1 |
| 7,159,011 B1 | 1/2007 | Knight et al. | |
| 7,296,060 B2 * | 11/2007 | Walsh | 709/208 |
| 7,461,168 B1 * | 12/2008 | Wan | 709/245 |
| 7,526,483 B2 * | 4/2009 | Samji et al. | 707/10 |
| 7,529,796 B2 | 5/2009 | Riddle | |
| 7,533,091 B2 * | 5/2009 | Plastina et al. | 707/5 |
| 7,546,463 B2 | 6/2009 | Karabulut | |
| 7,668,922 B2 | 2/2010 | Garbow et al. | |
| 2001/0032240 A1 | 10/2001 | Malone et al. | |
| 2002/0087632 A1 | 7/2002 | Keskar | |
| 2003/0014759 A1 | 1/2003 | Van Stam | |
| 2003/0023679 A1 * | 1/2003 | Johnson et al. | 709/204 |
| 2003/0070176 A1 | 4/2003 | Parker et al. | |
| 2003/0110450 A1 * | 6/2003 | Sakai | 715/529 |
| 2003/0182277 A1 * | 9/2003 | Kurakake | 707/3 |
| 2003/0197729 A1 | 10/2003 | Denoue et al. | |
| 2004/0001090 A1 | 1/2004 | Brown et al. | |
| 2004/0117444 A1 | 6/2004 | Goodman et al. | |

(Continued)

OTHER PUBLICATIONS

IBM Corporation, "Business aspects of social software and collaboration," Slide 24 entitled Thinkbox, CIPS ICE Conference, Nov. 6, 2006.

(Continued)

*Primary Examiner* — Sherief Badawi
*Assistant Examiner* — Christopher J Raab
(74) *Attorney, Agent, or Firm* — Cahn & Samuels, LLP

(57) ABSTRACT

A method for providing assets in a collaboration medium includes receiving information from an entity; analyzing the information to identify metadata; searching a system to locate assets relevant to the identified metadata; filtering the assets located on the system according to at least one of a predetermined user profile or a environment profile; sending pointers to the filtered assets on the entity's system to a second entity's system; and displaying pointers to the filtered assets in the collaboration medium.

20 Claims, 6 Drawing Sheets

(56) References Cited

U.S. PATENT DOCUMENTS

| | | |
|---|---|---|
| 2004/0179036 A1 | 9/2004 | Teplov et al. |
| 2004/0186721 A1 | 9/2004 | Beynon et al. |
| 2005/0071506 A1 | 3/2005 | Hettish |
| 2005/0076095 A1 | 4/2005 | Mathew et al. |
| 2005/0165935 A1 | 7/2005 | Moody et al. |
| 2005/0204297 A1 | 9/2005 | Banatwala et al. |
| 2005/0210396 A1 | 9/2005 | Galli |
| 2006/0004914 A1* | 1/2006 | Kelly et al. .................... 709/219 |
| 2006/0143236 A1* | 6/2006 | Wu ............................. 707/104.1 |
| 2006/0195790 A1* | 8/2006 | Beaupre et al. ............... 715/727 |
| 2006/0224943 A1* | 10/2006 | Snyder et al. .............. 715/501.1 |
| 2006/0259473 A1 | 11/2006 | Li et al. |
| 2007/0038665 A1* | 2/2007 | Kwak et al. .................... 707/102 |
| 2007/0043866 A1 | 2/2007 | Garbow et al. |
| 2007/0050467 A1* | 3/2007 | Borrett et al. .................. 709/213 |
| 2007/0073725 A1* | 3/2007 | Klein et al. ...................... 707/10 |
| 2007/0198534 A1* | 8/2007 | Hon et al. ........................ 707/10 |
| 2007/0198744 A1* | 8/2007 | Wensley et al. ............... 709/248 |
| 2007/0239755 A1* | 10/2007 | Mahoney ....................... 707/102 |
| 2007/0255674 A1* | 11/2007 | Mahoney ........................... 707/1 |
| 2007/0260704 A1* | 11/2007 | Sagoo et al. ................... 709/217 |

OTHER PUBLICATIONS

Office Action dated Dec. 10, 2008 in U.S. Appl. No. 11/335,796 (now US Patent 7,668,922).
http://www.fiveacross.com/products/features.shtml, fiver across InterComm Features, Sep. 5, 2005.
Ximian Dashboard, Nat Friedman (nat@ximian.com, Jul. 25, 2003, pp. 1-4).
http://www.imeem.com/index.aspx, imeem connect with people, Dec. 15, 2005.
Kanellos, Michael, http://news.com.com/2102-1008 3-5110910. html?tag=st util print, "Microsoft aims for search on its own terms", pp. 1-4, 2003.
http://help.yahoo.com/us/sbc/tutorials/ms7/im_file1.html, "Sending: Drag and Drop Onto the IM Window", Sep. 26, 2005, pp. 1-3.
http://help.yahoo.com/us/sbc/tutorials/ms7/im_file4.html, "Sending: Drag and Drop Onto the IM Window", Sep. 26, 2005, pp. 1-4.
http://www.nat.org/dashboard/, "The Dashboard", Dec. 15, 2005.

* cited by examiner

PROVIDING RELEVANT ASSETS IN COLLABORATION MEDIUMS

I. FIELD OF INVENTION

The present invention is directed to a system and methods for providing relevant assets between at least two entities in a collaboration medium based upon their interaction and upon at least one of a predetermined user profile or an environment profile.

II. BACKGROUND OF INVENTION

People and machines have trouble managing knowledge and finding assets relevant to contextual activity in collaboration mediums. Existing solutions to finding assets include search engines, which can find assets on a computer network. Other applications for finding assets include desktop dashboards that monitor local system activity and present relevant items. In addition, relevant lists may be made available to the specific user. For example, Amazon® will show what others purchased, but will not show what one customer purchased that another customer might like. Other applications are directed to algorithms for determining relevancy of assets based on keyword, phrases, and association mapping. In each case, users are unable to share, as part of a collaboration activity, their relevant assets based on their preferences, profiles, and interactions.

Collaboration mediums include both synchronous and asynchronous forms and may include shared web applications, instant messaging, text messaging, bulletin boards, discussion forums, and shared whiteboards. Such collaboration mediums may provide peer-to-peer perspectives in which one user can search the assets of other users on the network. Moreover, technologies to view other users' shared files are known.

U.S. Patent Application Publication No. 2003/0197729 A1 discloses that multiple users may access a collaborative data-sharing system during a data-sharing event. Each user can establish the level of sharing to be allowed with each other user and filtering criteria for filtering the data before it is provided to the other users. Data can be extracted from a number of different sources, including data input by other users and/or previously created information sources. For example, slides from a presentation on a similar topic may be identified and included by a user as a potential source of information to be used by other users. Shared data can be displayed on devices used by users to communicate with the collaborative data-sharing system. A user can select data provided by the collaborative data-sharing system, which was obtained from the data input by other users and/or from the identified additional data sources and added to that user's data as data entered by that user.

U.S. Patent Application Publication No. 2005/0210396 is directed to a framework that allows a number of software application agents to be stacked on top of an instant messenger application. Each of the software application agents establishes a connection with a third-party external service on the Internet or a local application in the user's computer and enables access to the external services for users of authoring applications and users engaged in instant messaging sessions.

U.S. Patent Application Publication No. 2005/0165935 A1 discloses a system for providing a local awareness client program user with document access information describing accesses to documents by remote users. The system provides document access information describing the documents accessed by one or more remote users, the applications used to access those documents, the times the documents were accessed, and/or other information describing the documents or the access to such documents made by the remote users.

U.S. Patent Application Publication No. 2005/0076095 A1 discloses a system for managing messages and/or documents comprising a document server to store a plurality of documents and/or folders containing the documents; and a virtual contextual file system including a context mapping module to analyze a current context selected by a user at an access device to identify a subset of documents and/or folders stored on the document server associated with the context selected by the user, the context mapping module to additionally map the subset of documents and/or folders stored on the document server to the access device.

U.S. Patent Application Publication No. 2003/0014759 A1 discloses a network-based system for recommending media content items based on user preferences. Clients contact a server on a periodic basis, independent of the user. In addition to client-server interaction, clients also interact with one another in peer-to-peer fashion. Peers query one another and evaluate their similarity to each other in an interactive comparison of user preferences. When two clients are sufficiently similar, the interaction culminates in the originating client downloading content listings from the targeted peer to generate suggestions for their user. If the two clients are dissimilar, the query may be terminated, or the targeted peer may route the query to a second targeted peer. In addition to the lists of preferences, the originating client may download actual content items from the targeted peers.

III. SUMMARY OF INVENTION

In an aspect of the invention, a method is provided for providing assets in a collaboration medium. Information is received from an entity. The information is analyzed to identify metadata. A system is searched to locate assets relevant to the identified metadata. The assets located on the entity's system are filtered according to at least one of a predetermined user profile or an environment profile. Pointers to the filtered assets on the entity's system are sent to a second entity's system. The pointers to the filtered assets are displayed in the collaboration medium.

In another aspect of the invention, a method is provided for providing assets in a collaboration medium. Information from a first entity is received. The information is analyzed to identify metadata. The first entity's local system is searched for assets relevant to the identified metadata. The assets located on the first entity's local system are filtered according to at least one of a predetermined user profile or an environment profile. Pointers to the filtered assets on the first entity's local system are sent to a second entity's local system. The second entity's local system is searched for assets relevant to the filtered assets on the first entity's local system. The assets located on the second entity's local system are filtered according to at least one of a predetermined user profile or an environment profile. The pointers to the filtered assets from each entity's local system are displayed in the collaboration medium.

In another aspect of the invention, a system is provided including a server comprising a collaboration medium and an agent comprising at least one client. The at least one client may be a message pre-processor for analyzing metadata in information entered into the collaboration medium; a search engine for searching a local system for assets relevant to the metadata; or a message post-processor for filtering relevant assets according to at least one of a predetermined user profile or an environment profile.

In another aspect of the invention, a computer program product is provided comprising a computer useable medium having a computer readable program. When executed on a computer, the computer readable program causes the computer to receive information from an entity; analyze the information to identify metadata; search a system to locate assets relevant to the identified metadata; filter the assets located on the system according to at least one of a predetermined user profile or an environment profile; send pointers to the filtered assets on the entity's system to a second entity's system; and display pointers to the filtered assets in the collaboration medium.

IV. BRIEF DESCRIPTION OF THE DRAWINGS

V. DETAILED DESCRIPTION OF THE DRAWINGS

As shown in FIGS. 1-6, the invention is directed to a system and methods for providing relevant assets between at least two entities in a collaboration medium based upon their interaction and upon their profiles, their environment, or a combination thereof. In this detailed description, references to "one embodiment", "an embodiment", or "in embodiments" mean that the feature being referred to is included in at least one embodiment of the invention. Moreover, separate references to "one embodiment", "an embodiment", or "embodiments" do not necessarily refer to the same embodiment; however, neither are such embodiments mutually exclusive, unless so stated, and except as will be readily apparent to those skilled in the art. Thus, the invention can include any variety of combinations and/or integrations of the embodiments described herein.

The collaboration medium may be synchronous or asynchronous and may include, but is not limited to, shared web applications, shared web experiences (e.g., blogs, wikis); shared web browsing, web shopping sites, instant messaging, text messaging, online bulletin boards, shared whiteboards, shared document production, discussion forums, discussion threads, voice over IP (e.g., conference call monitoring), and the like. In embodiments, the collaboration medium may be accessed by a networked computer system. Entities include, but are not limited to, users (people), computer applications, simulated people, automated assistants or agents (bots), devices, or any combination thereof. In an embodiment, a collaboration medium may show the at least two entities, for example, by screennames and/or by a buddy list. For clarity in the discussion below, the embodiment directed to a human user is utilized.

According to the invention, a method for providing assets in a collaboration medium may comprise receiving information from an entity; analyzing the information to identify metadata; searching a system to locate assets relevant to the identified metadata; filtering the assets located on the system according to at least one of a predetermined user profile or an environment profile; sending pointers to the filtered assets on the entity's system to a second entity's system; and displaying pointers to the filtered assets in the collaboration medium.

Figure 1:
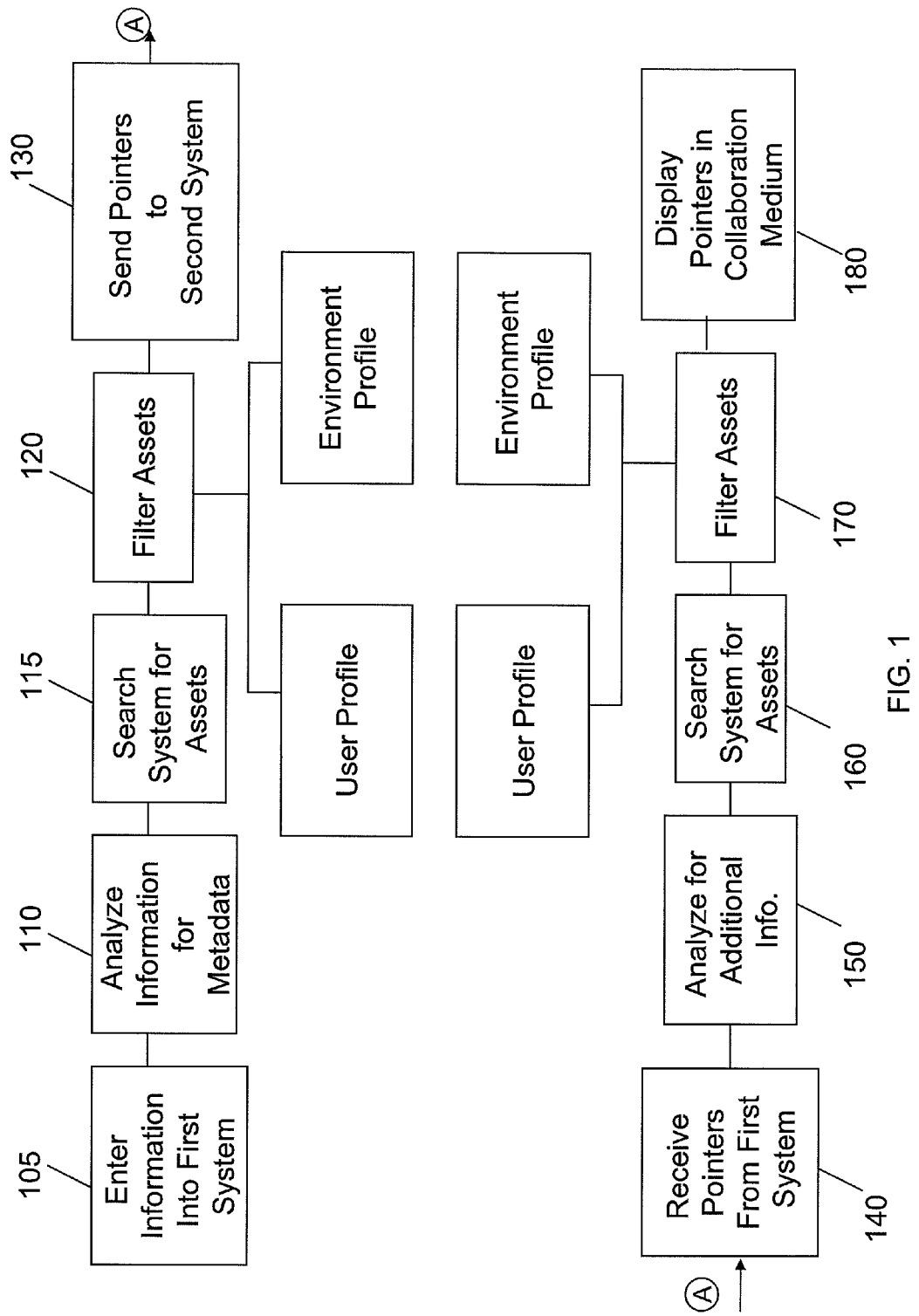
FIG. 1 is a schematic illustration of a method according to a first embodiment of the invention.

In the exemplary method shown in FIG. 1, a first user enters information into a collaboration medium via a first system, 105. The information received into the collaboration medium includes, but is not limited to, at least one of text, documents, images, bookmarks, links, e-mails, sounds, or files. For example, a first user may type text into an interface module of an instant messaging collaboration medium via the first system. In embodiments, information entered into the collaboration medium may include embedded or attached information, for example, embedded or attached files, documents, or images, as well as information uploaded to the collaboration medium.

The entered information is analyzed for metadata, 110. Such metadata may include, but are not limited to, at least one of keywords, pronouns, phone numbers, fax numbers, web links, author, title, dates, personal names, places, addresses, proper nouns, adjectives, verbs, phrases, tracking numbers, billing numbers, or concepts. In an embodiment, the analysis for metadata may include string-to-concept mapping using a predetermined percentage of similarity. Noise words, such as common words, prepositions, articles, and the like, may be removed from the entered information during analysis. In embodiments, the metadata may be predetermined (i.e., pre-programmed). However, specific types of metadata may be selected by the users of the collaboration medium.

The first system is searched to locate any assets that may be relevant to the identified metadata, 115. Assets may include, but are not limited to, at least one of files, documents, sounds, pictures, movies, presentations, slides, spreadsheets, e-mails, icons, or avatars. In an embodiment, the assets also may comprise prior conversations (e.g., chat transcripts), notes, screen recordings, mouse/keyboard recordings, changes in settings over the course of prior interactions, or meetings between users of the collaboration medium.

The located assets are filtered using at least one of a predetermined user profile or an environment profile, 120. The predetermined user profile may contain at least one preference. In embodiments, the at least one preference may include whether or not the user wants to view and/or share types of assets (e.g., images, sounds, presentations, e-mails) or specific assets (e.g., particular images, sounds, presentations, e-mails). The at least one preference may include a list of other people with whom the user's assets may be shared. The list may identify other users by name or by classification (e.g., friend, co-worker, family, security clearances, organizational identifiers, roles, e.g., executive, developer, author, and the like).

The environment profile may include at least one of the current time; whether or not a system supports modem or wireless access; the speed of such access; whether or not a system has audio or video capability; the default language of a system (e.g., only English files should be shared); whether other programs may be running on a system; or how many pointers a user wants to display. In embodiments, the environment profile may include a list of certain types of files for which a user might specify an interest (e.g. images, presentations, jpg, gif, tiff, PowerPoint®). This list may be created based on the possible metadata types in a system. Thus, the environment profile may determine if the proper application for the files is installed and whether there is enough space to access such files. In embodiments, based upon the identification of the users, the environment profile may adjust a security level depending upon characterization of at least one user as an employee, a contractor, an officer, a salesperson, a government official, or an outsider. Thus, the environment profile helps determine, for example, the types and sizes of assets that may be shared in the collaboration medium.

Pointers to the filtered assets of the first system are sent to a second system being utilized by a second user of the collaboration medium, 130. Each pointer comprises a Universal Resource Indicator (URI) that points to an asset. In embodiments, a pointer may comprise at least one of a link (URL), an icon, a button, or a thumbnail in a graphical user interface (GUI). The metadata identified in the first system may optionally also be sent to the second system. When there are multiple users of the collaboration medium, the pointers to the filtered assets, and optionally the identified metadata, from the first system may be sent to the system of each user. The searching for assets and filtering of assets occur on a local system prior to pointers to such assets being transmitted to a second local system.

The second system receives the pointers and any optional identified metadata from the first system, 140. The pointers to the filtered assets, and any identified metadata, from the first system are analyzed to determine whether additional information may be needed to process them, 150. For example, if a filtered asset from the first system is in French, the second system may need to access a translation application. Another example may include the need to translate from one file format to another. For example, a local system might not support a specific video format and a third party system could be used to translate the media to a native (local) supported format.

The second system is searched to locate any assets that may be relevant to the filtered assets of the first system and any optional identified metadata from the first system, 160. The located assets on the second system and the pointers to the assets from the first system may be aggregated and limited to a predetermined number, for example, 1-100 assets.

The located assets on the second system and the pointers to the filtered assets of the first system are filtered using one of more of a predetermined user profile or an environment profile of the second system, 170. As with the first system, the predetermined user profile may contain at least one preference, for example, a list of other people with whom the user's assets may be shared. Similarly, the environment profile helps determine, for example, the types and sizes of assets may be shared in the collaboration medium.

Pointers to the filtered assets from the first user's system and pointers to filtered assets from the second user's system are displayed in the collaboration medium to both users, 180. In an alternative embodiment, pointers to the filtered assets from the first user's system are displayed solely to the second user and pointers to the filtered assets of the second user's system are displayed solely to the first user.

In embodiments, the process illustrated in FIG. 1 may also operate in reverse, either independently or concurrently, with the shown process (i.e., beginning with the user of the second system). Thus, the second user enters information (e.g., text) into the collaboration medium; the information received into the collaboration medium is analyzed for metadata; the second system is searched for relevant assets; and the relevant assets are filtered. Pointers to the filtered assets, and optionally the identified metadata, are sent to the first system and analyzed to determine if additional information is required for processing. The first system is searched for assets relevant to the filtered assets and any optional identified metadata from the second system. The located assets on the first system and the pointers to the assets from the second system may be aggregated and limited to a predetermined number. The located assets on the first device and the pointers to the filtered assets of the second system are filtered using one of more of a predetermined user profile or an environment profile.

Pointers to the filtered assets from the second user's system and pointers to filtered assets from the first user's system are displayed in the collaboration medium to one or both users. Thus, the relevant collective assets between at least two users are displayed in the collaboration medium.

In an embodiment, pointers to the relevant filtered assets may be displayed as a single list (e.g., a list of from 1 to 100, for example, from 1 to 10). In embodiments, any pointers that are not listed may be paged through by a user. For example, if 40 assets are located and only 10 pointers are displayed, a user may page through the remaining 30 pointers. As the at least two users continue working and exchanging information in the collaboration medium, the list may be continually updated so that the pointers are indexed according to priority based upon the exchange in the collaboration medium. In embodiments, each user may directly access filtered assets on the other user's system, for example, by clicking on the corresponding pointer (i.e., peer-to-peer sharing).

Figure 2:
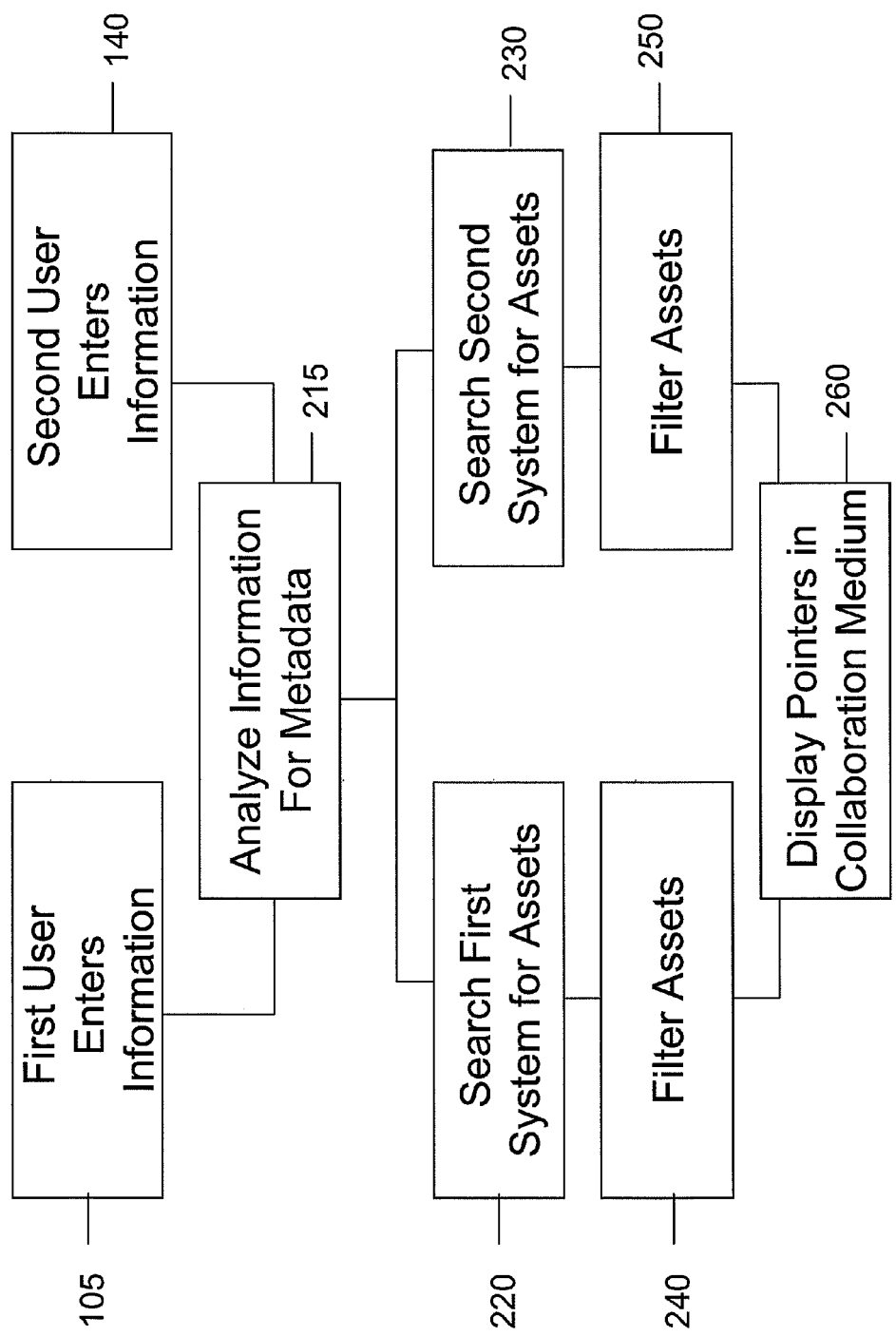
FIG. 2 is a schematic illustration of a method according to a second embodiment of the invention.

In the exemplary method shown in FIG. 2, at least two users enter information via a respective system into a collaboration medium, 105 and 140. In this embodiment, metadata of the entire exchange is analyzed instead of each user's entry being separately analyzed, 215. Searching for assets corresponding to the identified metadata occurs in tandem for each user's system, 220 (first system) and 230 (second system). In embodiments, filtering of the relevant assets may also occur simultaneously, 240 (first system) and 250 (second system). The pointers for the relevant filtered assets are displayed in the collaboration medium, 260.

In embodiments, the method of the invention may occur in the background of the collaboration medium. The method may be either synchronous or asynchronous with respect to with the exchange between the at least two users. Based upon the collaboration medium, at least one user may have the ability to restart the method at any time or may simply toggle the method of identifying relevant assets on or off.

As noted, the invention can be applied to several collaboration mediums and is not to be limited by the examples provided herein. However, to provide clarity and simplicity, the example of instant messaging will be used in the following discussion.

Instant messaging is often made up of at least two users sending assets (e.g., text, images, sounds, video, links, bookmarks, files, and the like) between each user via an instant message graphical user interface (GUI). Primarily, this medium is a real-time collaboration experience where two or more users participate in a discussion over a computer network.

For example, Rachel and Rebecca are both colleagues working for Madison Inc. The company uses instant messaging as part of their online collaboration. Rachel and Rebecca are a part of the sales team for an account, Acme Widget Inc. They are working on a new sales bid and discuss the account in an instant messaging collaboration medium. As they chat, their interaction is analyzed for metadata, for example, by pulling out keywords and phrases.

Their local systems are searched for assets relevant to the identified metadata. The relevant located assets are filtered based on the profiles of each user. For example, Rachel may have several presentations marked as private or some assets specifically identified as visible for Rebecca. The located assets filter out any results Rebecca should not see. Similarly, Rebecca's located assets are filtered based upon her profile. In embodiments, the clients may also filter the assets according to an environment profile.

Pointers of the filtered assets are displayed in real-time in the instant messaging GUI as Rachel and Rebecca chat. The displayed assets are relevant to the current context and are specifically defined by Rachel and Rebecca's discussion and profiles.

In embodiments, Rebecca may open any asset directly from Rachel's machine, save it for later, or simply discuss the asset with Rachel in real-time via the instant messaging interface module. The dynamic results based on the shared context (the chat interaction, the profiles and preferences of users and the assets of each user) enhance the typical instant messaging interaction.

Figure 3:
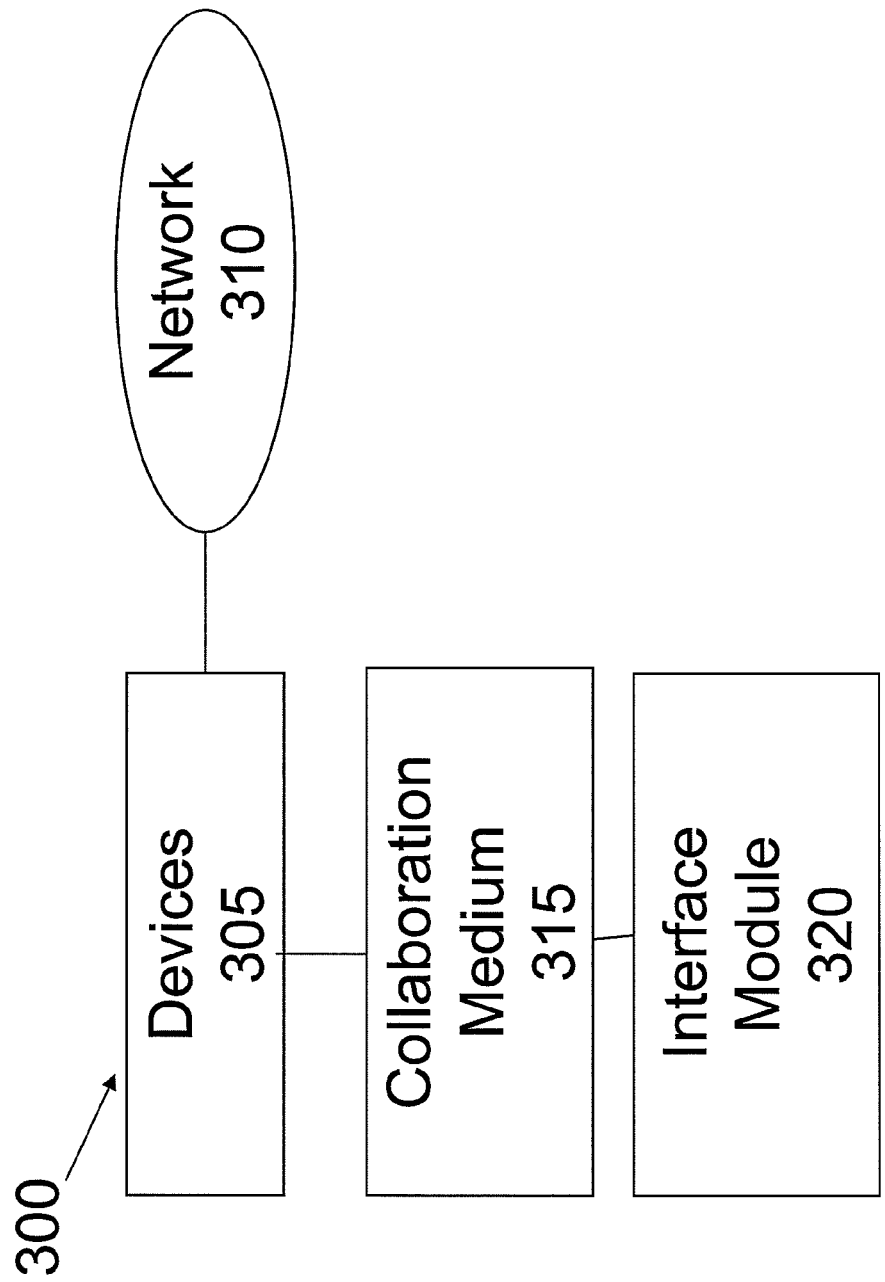
FIG. 3 is a block diagram showing an illustrative system of the invention.

FIG. 3 is a block diagram showing an illustrative system of the invention, denoted by 300. The illustrative system includes electronic or digital devices 305 (e.g., a personal computer, cellular telephone, personal digital assistant or PDA, game device, MP3 player, television) to access a collaboration medium. The devices may be connected to a network 310 (e.g., the Internet, local area network (LAN), wide area network (WAN)). In embodiments of the invention, the system includes at least one collaboration medium 315, which may be an application. The collaboration medium includes at least one interface module 320 by which at least two entities may input and exchange information. The at least one collaboration medium or application may reside on a server. The illustrative system is but one example, and one of ordinary skill in the art would recognize that many other variations may exist, all of which are contemplated by the invention.

Figure 4:
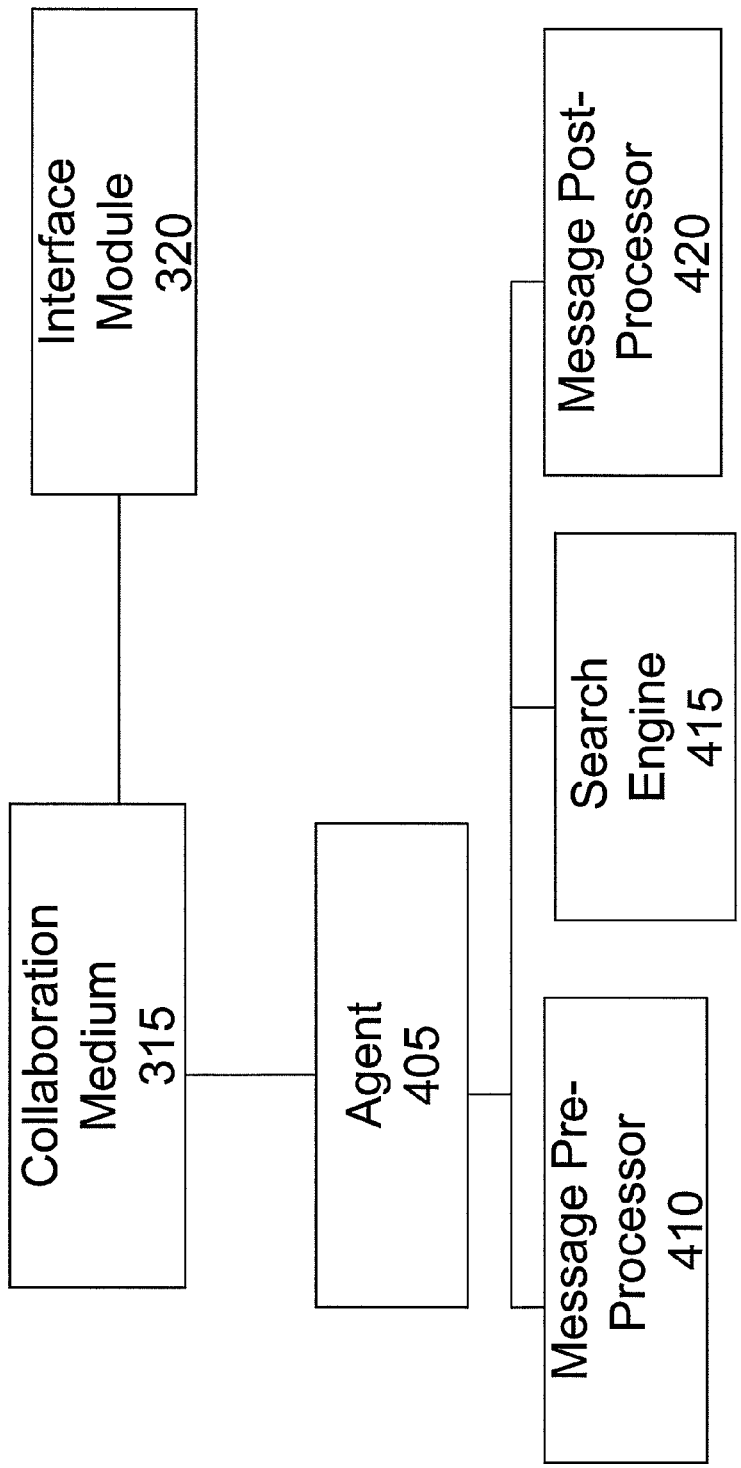
FIG. 4 is a diagram showing an illustrative agent of the invention.

FIG. 4 illustrates an exemplary agent 405 of the invention which includes at least one client comprising a message pre-processor 410, a search engine 415, or a message post-processor 420. In embodiments, the agent and its clients may be applications residing on at least one of the electronic or digital devices accessing the at least one collaboration medium. Alternatively, the search engine may reside on a separate server, either its own server or the server on which the collaboration medium resides. The search engine may be any search engine capable of locating assets, for example, Yahoo® or Google® search engines.

As illustrated in FIG. 1 and FIG. 2, a message pre-processor analyzes metadata in information entered into the collaboration environment by a user, for example, via an interface module. A search engine searches the user's local system for assets relevant to the identified metadata. A message post-processor filters the relevant assets located by the search engine using at least one of a predetermined user profile or an environment profile. The interface module allows the at least two users to exchange information in the collaboration medium and may also provide a display for pointers to the filtered relevant assets.

Figure 5:
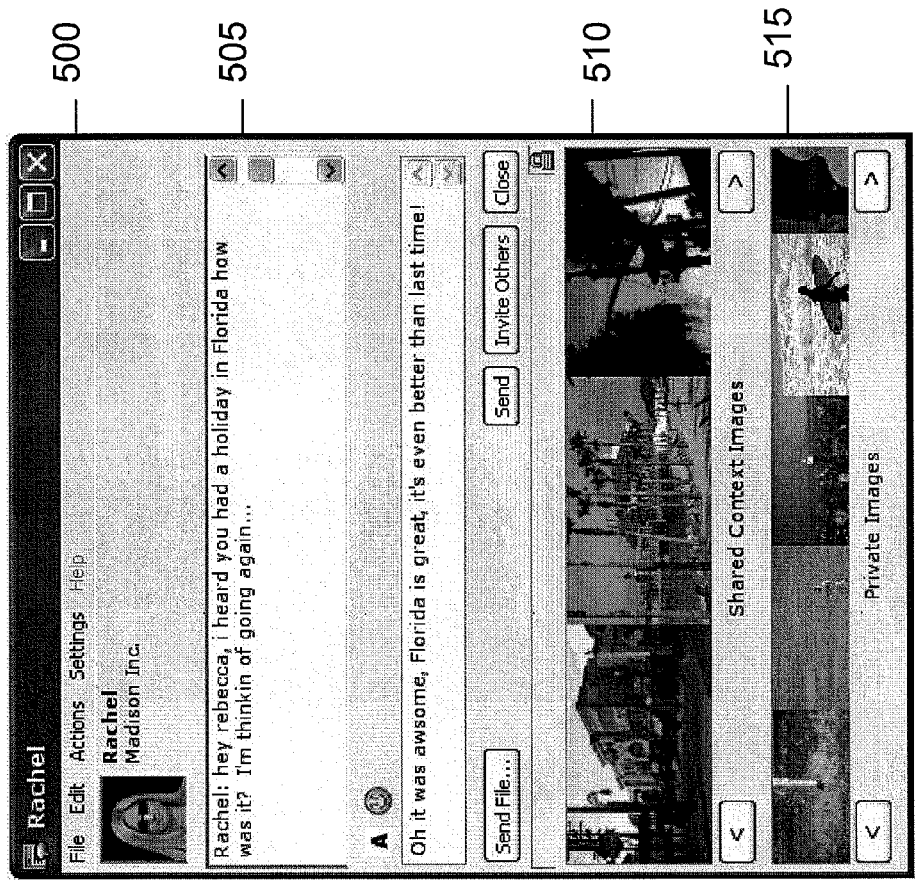
FIG. 5 is an illustration of an interface module of an instant messaging collaboration medium according to an embodiment of the invention.

FIG. 5 illustrates an exemplary interface module of an instant messaging collaboration medium according to the invention. In FIG. 5, Rachel and Rebecca have a personal discussion via an interface module 500 of an instant messaging collaboration medium.

The message pre-processor of Rachel's system identifies the metadata "Florida" as a location or proper noun in text field 505. A search engine scours Rachel's system for assets that are relevant to the term "Florida" and identifies several image files related to the metadata. The image files are filtered according to Rachel's profile, in which she has indicated which files may be shared 510 and which are to be kept private 515. The pointers for the image files are sent to Rebecca's system and are analyzed. Rebecca's device is searched, and any located assets are filtered. Rachel's relevant image files are displayed in the instant messaging GUI so that both she and Rebecca may see the pointers to the shared image files 510. However, for the files to be kept private, the corresponding pointers 515 are only visible in Rachel's instant messaging GUI.

It should be noted that the method according to the present invention may also concurrently operate in reverse for Rebecca's system. Thus, in FIG. 5, Rebecca has also been to Florida and her shared Florida pictures appear with Rebecca's in shared image files 510.

Figure 6:
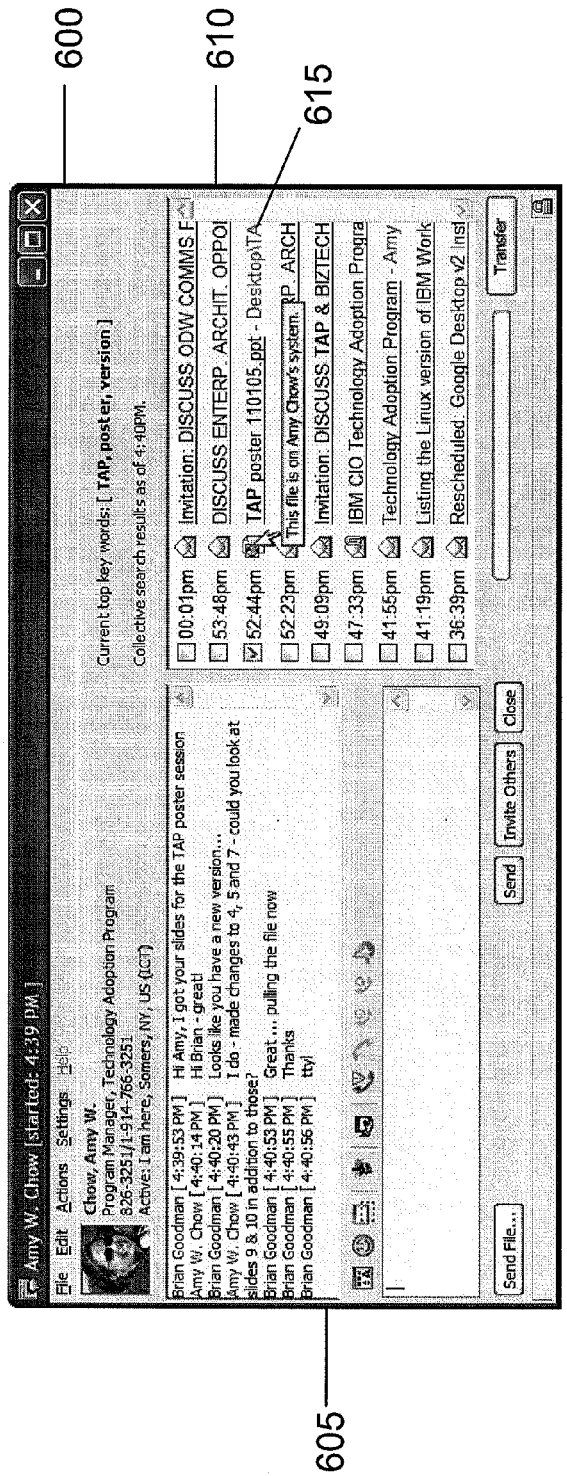
FIG. 6 is an illustration of an interface module of an instant messaging collaboration medium according to an embodiment of the invention.

FIG. 6 illustrates an exemplary interface module of an instant messaging collaboration medium according to the invention. In FIG. 6, Brian and Amy have a discussion via an interface module 600 of an instant messaging collaboration medium.

The message pre-processor of Amy's system identifies the metadata "TAP", "poster", and "version" from text field 605. A search engine scours Amy's system for assets that are relevant to the identified metadata. The located assets are filtered according to Amy's profile. The pointers for the filtered assets are sent to Brian's system and are analyzed. Brian's device is searched, and any located assets are filtered. The process occurs in reverse for Brian's system. The relevant assets of both Amy and Brian's devices are displayed together in a single list 610 in the instant messaging GUI so that both entities can see the relevant shared assets. Either party can access the relevant shared assets via the interface module. For example, Brian can assess the "TAP poster" PowerPoint® presentation 615 located on Amy's system directly from the instant message interface module.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Computer program code for carrying out operations of the present invention may be written in a variety of computer programming languages. The program code may be executed entirely on at least one computing device, as a stand-alone software package, or it may be executed partly on one computing device and partly on a remote computer. In the latter scenario, the remote computer may be connected directly to the one computing device via a LAN or a WAN (for example, Intranet), or the connection may be made indirectly through an external computer (for example, through the Internet, a secure network, a sneaker net, or some combination of these).

It will be understood that each block of the flowchart illustrations and block diagrams and combinations of those blocks can be implemented by computer program instructions and/or means. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowcharts or block diagrams.

The exemplary and alternative embodiments described above may be combined in a variety of ways with each other. Furthermore, the steps and number of the various steps illustrated in the figures may be adjusted from that shown.

Although the present invention has been described in terms of particular exemplary and alternative embodiments, it is not limited to those embodiments. Alternative embodiments, examples, and modifications which would still be encompassed by the invention may be made by those skilled in the art, particularly in light of the foregoing teachings.

What is claimed is:

1. A method for providing assets in a collaboration medium, comprising:
   receiving information from a first entity in the collaboration medium;
   analyzing the information to identify metadata;
   searching the first entity's local computer system for assets relevant to the identified metadata;
   filtering the assets located on the first entity's local computer system according to a predetermined user profile and an environment profile;
   sending pointers to the filtered assets on the first entity's local computer system to a second entity's local computer system;
   searching the second entity's local computer system for assets relevant to the filtered assets on the first entity's local computer system;
   filtering the assets located on the second entity's local computer system according to a predetermined user profile and an environment profile; and
   displaying pointers to the filtered assets from each entity's local computer system in the collaboration medium.

2. A method according to claim 1, wherein the received information comprises at least one of text, documents, images, bookmarks, links, e-mails, sounds, files, embedded information, attached information, or uploaded information.

3. A method according to claim 1, wherein the metadata comprises at least one of keywords, pronouns, phone numbers, fax numbers, web links, author, title, dates, personal names, places, addresses, proper nouns, adjectives, verbs, phrases, tracking numbers, billing numbers, or concepts.

4. A method according to claim 1, wherein the assets comprise at least one of documents, sounds, pictures, movies, presentations, slides, spreadsheets, e-mails, icons, avatars, screen recordings, mouse/keyboard recordings, changes in settings over the course of prior interactions, or meetings between entities using the collaboration medium.

5. A method according to claim 1, wherein the predetermined user profile comprises at least one preference comprising whether or not the first entity or the second entity wants to view and/or share types of assets or specific assets.

6. A method according to claim 5, wherein the at least one preference further comprises a list of other people with whom the assets of the first entity or the second entity may be shared.

7. A method according to claim 1, wherein the environment profile comprises at least one of; whether or not a computer system supports modem or wireless access; the speed of such access; whether or not a computer system has audio or video; the default language of a computer system; or whether other programs may be running on a computer system.

8. A method according to claim 1, wherein, based upon the identification of the first and second entities using the collaboration medium, the environment profile adjusts a security level depending upon characterization of at least one entity as an employee, a contractor, an officer, a salesperson, a government official, or an outsider.

9. A method according to claim 1, wherein the collaboration medium comprises shared web applications, shared web experiences, shared web browsing, web shopping sites, instant messaging, text messaging, online bulletin boards, shared whiteboards, shared document production, discussion forums, discussion threads, or voice over IP.

10. A method according to claim 1, wherein each of the pointers comprises a Universal Resource Indicator that points to an asset.

11. A method according to claim 1, wherein the pointers to the filtered assets are displayed as a list of at least one icon, link, button, or thumbnail in a graphical user interface, said list being continually updated.

12. A method according to claim 1, wherein the collaboration medium comprises instant messaging.

13. A method according to claim 1, wherein an entity may directly access a filtered asset from another entity's local computer system via the collaboration medium.

14. A method according to claim 1, further comprising operating the method concurrently in reverse beginning with the second entity's local computer system.

15. A method according to claim 1, wherein as the first entity and second entity exchange information in the collaboration medium, a list of displayed pointers to the filtered assets is continually updated so that the list of pointers is indexed according to priority based on the information exchanged in the collaboration medium.

16. A method according to claim 1, wherein the two entities exchange information in the collaboration medium in real-time.

17. A method according to claim 16, wherein metadata of an entire exchange between the two entities in the collaboration medium is analyzed.

18. A method according to claim 1, wherein assets marked shared in a user profile are filtered and displayed to both the first and second entities and assets marked private in a user profile are filtered and displayed only to one entity.

19. A method according to claim 1, wherein searching for assets on the first entity's and second entity's local computer systems occurs in tandem and filtering of located assets for each local computer system occurs simultaneously.

20. A computer program product, comprising:
- a non-transitory computer useable storage medium having a computer readable program, wherein the computer readable program when executed on a computer causes the computer to:
- receive information from a first entity;
- analyze the information to identify metadata;
- search the first entity's local computer system to locate assets relevant to identified metadata;
- filter the assets located on the computer system of the first entity according to a predetermined user profile and an environment profile;
- send pointers to the filtered assets on the computer system of the first entity to a computer system of a second entity;
- search the second entity's local computer system for assets relevant to the filtered assets on the first entity's local computer system; and
- display pointers to the filtered assets in a collaboration medium.

\* \* \* \* \*